United States Patent [19]

Schläfer et al.

[11] 4,415,333

[45] Nov. 15, 1983

[54] SOLID COMPOSITIONS OF WATER-SOLUBLE FIBER-REACTIVE DYESTUFFS AND DIALKYLNAPHTHALENE SULFONIC ACID AND FORMALDEHYE CONDENSATE

[75] Inventors: Ludwig Schläfer, Kelkheim; Heinz Uhrig, Steinbach, both of Fed. Rep. of Germany

[73] Assignee: Hoechst Aktiengesellschaft, Frankfurt am Main, Fed. Rep. of Germany

[21] Appl. No.: 360,401

[22] Filed: Mar. 22, 1982

[30] Foreign Application Priority Data

Mar. 24, 1981 [DE] Fed. Rep. of Germany ....... 3111488

[51] Int. Cl.$^3$ ............................ C09B 67/24; D06P 1/38
[52] U.S. Cl. .................................. 8/524; 8/543; 8/549; 8/589; 8/918
[58] Field of Search .................. 8/524, 543, 589, 549

[56] References Cited

U.S. PATENT DOCUMENTS

| | | | |
|---|---|---|---|
| 4,088,441 | 5/1978 | Meininser et al. | 8/524 |
| 4,214,872 | 7/1980 | Uhrig et al. | 8/589 |
| 4,264,323 | 4/1981 | Capponi et al. | 8/527 |
| 4,283,195 | 8/1981 | Nakatsuka et al. | 8/524 |
| 4,349,349 | 9/1982 | Nakatsuka et al. | 8/527 |

FOREIGN PATENT DOCUMENTS 1043490 9/1966 United Kingdom .

*Primary Examiner*—A. Lionel Clingman
*Attorney, Agent, or Firm*—Curtis, Morris & Safford

[57] ABSTRACT

Solid, pulverulent dyestuff compositions of fiber-reactive dyestuffs, which compositions contain a condensation product formed from a dialkylnaphthalenesulfonic acid or a mixture of two or more dialkylnaphthalenesulfonic acids and formaldehyde, as an auxiliary intended to ensure the solubility of the dyestuffs in salt-containing and alkaline aqueous padding liquors.

18 Claims, No Drawings

SOLID COMPOSITIONS OF WATER-SOLUBLE FIBER-REACTIVE DYESTUFFS AND DIALKYLNAPHTHALENE SULFONIC ACID AND FORMALDEHYE CONDENSATE

The present invention is in the industrial field of fiber-reactive dyestuffs.

European Patent Application No. 0,014,326 has disclosed dyestuff compositions of a fiber-reactive anthraquinone dyestuff which contain, as an auxiliary, a condensation product formed from an alkylnaphthalenesulfonic acid and formaldehyde. Monoalkylnaphthalenesulfonic acids having alkyl groups of 1 to 4 C atoms are described as an alkylnaphthalenesulfonic acid which serve together with formaldehyde for the preparation of such an auxiliary. These known compositions, however, have certain technological deficiencies, in particular in respect of their stability in salt- and alkali-containing aqueous padding and dyeing liquors.

The present invention now provides solid, pulverulent compositions of fiber-reactive dyestuffs, which compositions are very highly suitable for the preparation of salt- and alkali-containing padding and dyeing liquors or printing pastes, in which liquors and pastes even sparingly soluble fiber-reactive dyestuffs have a very high solubility. These compositions are characterized by the content of an auxiliary ensuring the solubility of sparingly soluble dyestuffs even in salt-containing and alkaline aqueous padding liquors, which auxiliary is a condensation product from a dialkylnaphthalenesulfonic acid or a mixture of two or more, such as, three, four or five, dialkylnaphthalenesulfonic acids and formaldehyde; the alkyl groups are preferably those which have 1 to 4 C atoms, such as, for example, methyl, ethyl, n-propyl, n-butyl, isobutyl and tert.-butyl groups.

Compositions according to the invention can contain additives customary in dyestuff compositions, such as, for example, buffer substances or a dedusting agent (as a rule 0.5 to 5% by weight, relative to the total formulation), such as, for example, sodium acetate, sodium dihydrogen phosphate or sodium oxalate as buffer substances and a commercially available dedusting agent, for example one based on a mineral oil emulsion, further also inorganic alkali metal salts (electrolytes), such as sodium chloride or sodium sulfate, which are formed, for example, in the synthesis of dyestuffs or of the condensing agents and are contained in these synthesis products. These solid compositions preferably contain 40 to 95% by weight, particularly preferably 50 to 85% by weight, of a water-soluble fiber-reactive dyestuff (instead of one fiber-reactive dyestuff being contained in compositions according to the invention, it is also possible for two or more dyestuffs to be contained in the compositions within the total concentration indicated) and furthermore 5 to 70% by weight, particularly preferably 10 to 50% by weight, of one or more of the abovementioned condensation products.

Compositions according to the invention preferably contain fiber-reactive dyestuffs in the form of their alkali metal salts, such as potassium salts, and in particular sodium salts.

Preferably those condensation products are contained, according to the invention, in the compositions the dialkylnaphthalenesulfonic acid components of which contain per mole on average 1 to 2, preferably 1 to 1.5, sulfonic acid groups and which condensation products were prepared with the use of 0.5–4, preferably 1 to 3.6, moles of formaldehyde per mole of a dialkylnaphthalenesulfonic acid. They are preferably present in compositions according to the invention in the form of their neutral alkali metal salts, such as in particular sodium salts.

Among fiber-reactive dyestuffs which can be used in compositions according to the invention, all those are possible which have at least one group which imparts solubility in water, such as a sulfo, sulfato or carboxy group. Numerous such fiber-reactive dyestuffs are known. They can belong, for example, to the class of the monoazo dyestuffs, disazo dyestuffs or polyazo dyestuffs, to the class of the copper, chromium or cobalt complex monoazo dyestuffs or disazo dyestuffs, further to the class of the anthraquinone dyestuffs, phthalocyanine dyestuffs, such as, in particular, copper or nickel phthalocyanine dyestuffs, metal-containing formazan dyestuffs, such as, in particular, copper or nickel formazan dyestuffs, or to the class of the dioxazine, azine, nitro and stilbene dyestuffs.

Examples of fiber-reactive groups contained in the fiber-reactive dyestuffs are those from the vinylsulfone series, from the monofluoro- and difluoro- and monochloro- and dichloro-triazinyl series and also of other chlorine-substituted acylamides, such as, in particular, other halogen-substituted, preferably chloroor fluoro-substituted heterocyclic radicals containing nitrogen atoms; numerous such fiber-reactive groups are known from the literature.

Among fiber-reactive dyestuffs which can be contained in compositions according to the invention in particular those dyestuffs are preferred which correspond to the formulae (1) to (12); these formulae are drawn in the form of the free acid. These dyestuffs are preferably present in the compositions according to the invention in the form of their alkali metal salts, such as, in particular, sodium salts.

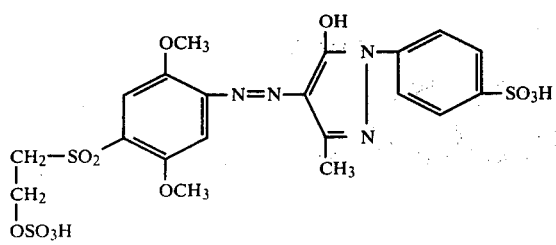

(1)

-continued
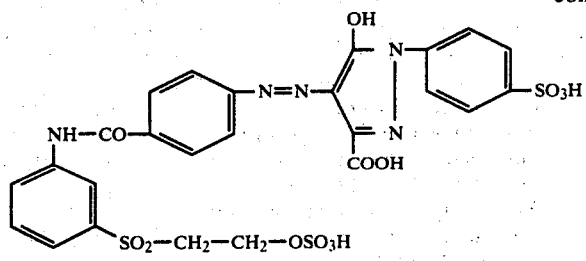
(2)
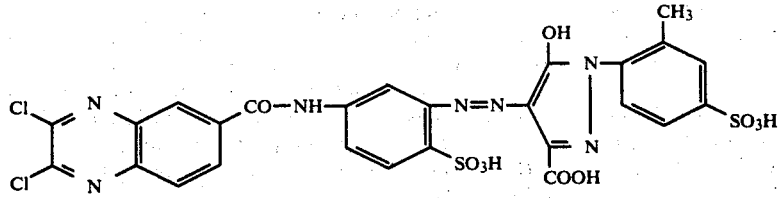
(3)
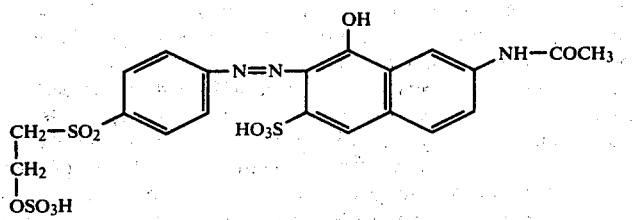
(4)
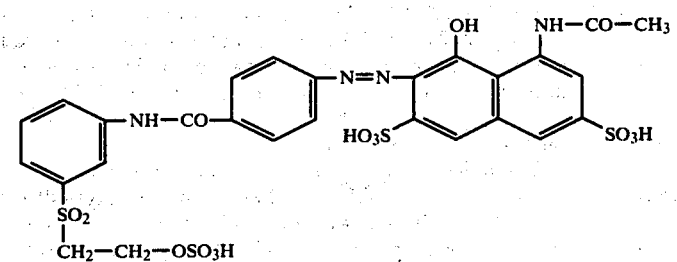
(5)
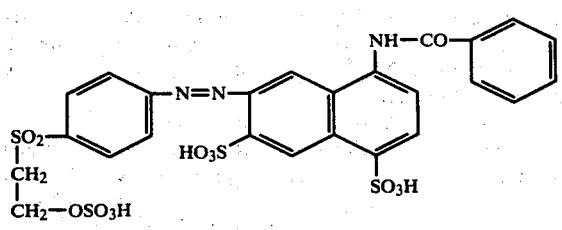
(6)
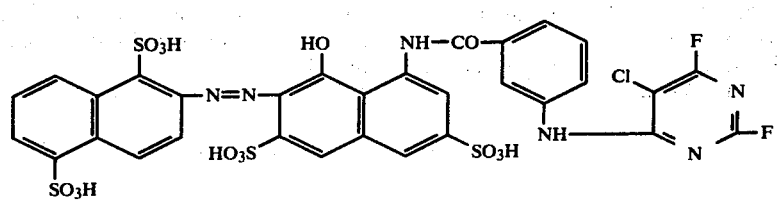
(7)
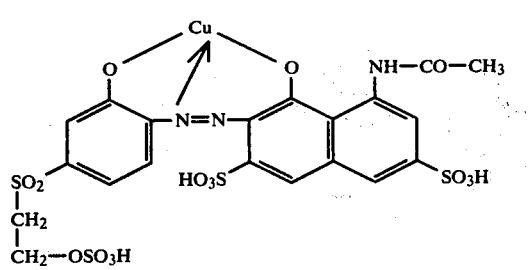
(8)

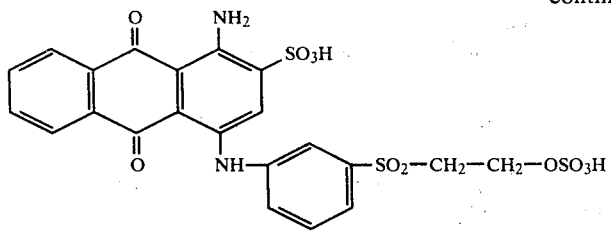
(9)

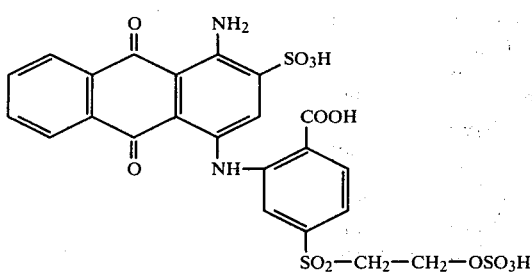
(10)

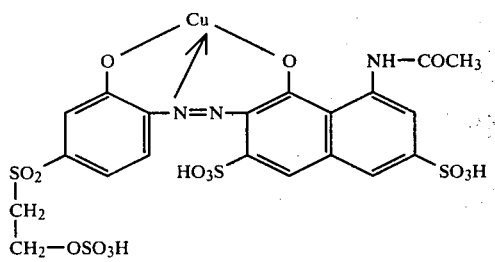
(11)

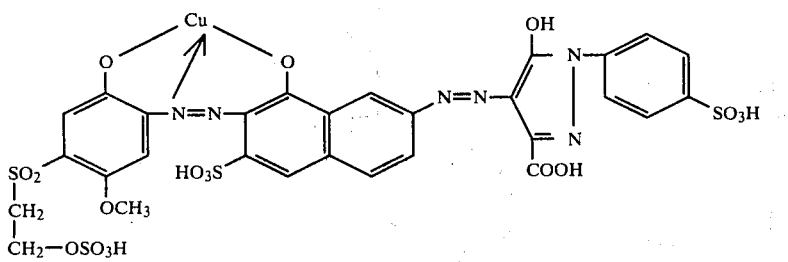
(12)

Compositions according to the invention can be used to prepare, by dissolving in water and by means of corresponding additives customary in the preparation of salt-containing and alkaline, aqueous dyebaths, padding liquors and printing pastes, also those salt-containing and alkaline, aqueous dyeing liquors, dye-baths and printing pastes which have a satisfactory stability and in which a fiber-reactive dyestuff is sufficiently readily soluble even if it has only a poor solubility in water. Additives of this type are neutral salts (electrolytes), such as sodium chloride or sodium sulfate, and/or alkaline agents, such as, in particular, alkali metal hydroxides and alkali metal salts of weak or medium strong acids, such as, for example, sodium hydroxide, sodium carbonate, potassium carbonate, sodium bicarbonate, trisodium phosphate, sodium silicate (water glass) and sodium acetate. Compositions according to the invention are thus very highly suitable for the preparation of salt-containing and alkaline dyeing liquors, padding liquors and printing pastes for fiber-reactive dyestuffs of any kind, particularly advantageously for those fiber-reactive dyestuffs which do not have a very marked solubility in water. It is possible to use these dyeing liquors, padding liquors and printing pastes, and thus compositions according to the invention, in a customary manner to dye or print fiber materials suitable for dyeing by fiber-reactive dyestuffs, such as wool and synthetic polyamides and, in particular, natural and regenerated cellulose fibers, to give level and speck-free deep shades. Since a satisfactory solubility in water of the fiber-reactive dyestuffs used in a compulsory prerequisite, in particular when dyeing from aqueous alkaline padding liquors, since relatively larger quantities of dyestuffs, in addition to the alkaline agents, must also be soluble in the comparatively small volume of a padding liquor, compositions according to the invention are particularly advantageously suitable in particular for use in those important dyeing processes involving reactive dyestuffs which are known by the names: one-bath pad-batch, one-bath pad-drying and short-time pad processes, or by similar names.

It was surprising that dyestuff compositions according to the invention produce padding liquors by means of which perfectly level, deep dyeings can be obtained, since dyestuff compositions containing similarly constructed condensation products as auxiliaries, such as reaction products from monoalkylnaphthalenesulfonic acids and formaldehyde, as a rule do not ensure the preparation of such salt-containing and alkaline aqueous, stable padding liquors, with the result that dyestuff precipitations occur and level dyeings cannot be obtained by means of padding liquors, in particular in the pad processes mentioned.

Compositions according to the invention can be obtained in a customary manner by mixing together the various components. It is thus possible, for example, to mix a fiber-reactive dyestuff and the auxiliary mentioned, if desired together with a customary dedusting agent and electrolytes, mechanically in a drum and/or to grind the mixture in a mill to produce a finegrained powder. Additives, such as, in particular, the auxiliary mentioned, can be added in a solid form or as an aqueous solution to the moist press cake of a dyestuff, which press cake can be obtained in a customary manner in the synthesis of the dyestuff, and mixed with one another and this mixture can be converted, by drying, preferably by spray-drying, into a solid composition according to the invention.

Compared to dyestuff compositions disclosed in European Patent Application No. 0,014,326, compositions according to the invention produce, when the condensation products mentioned are used in accordance with the invention, padding liquors which have an improved stability and which produce level pad dyeing, for example, also with the fiber-reactive anthraquinone dyestuff C.I. Reactive Blue 19.

The examples which follow serve to illustrate the invention in more detail. Parts are parts by weight and percentage data are percent by weight, unless otherwise indicated. Parts by weight relate to parts by volume as a kilogram relates to a liter.

EXAMPLE 1

30 parts of a dyestuff powder, having a content of about 75% of the dyestuff of the formula

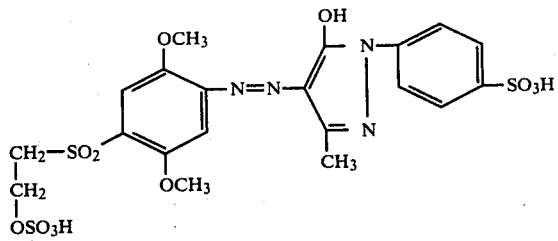

in the form of the sodium salt and about 25% of electrolyte (sodium chloride/sodium sulfate), and also 10 parts of a condensation product formed from 0.8 mole of bibutylnaphthalenesulfonic acid, 1 mole of dimethylnaphthalenesulfonic acid and 3.6 moles of formaldehyde, were ground together.

To prepare an alkaline, salt-containing padding liquor the resulting solid dyestuff composition according to the invention was dissolved in 800 parts of water, and 22 parts by volume of a 33% strength aqueous sodium hydroxide solution and 130 parts of a 70% strength aqueous sodium silicate solution were added. The dyestuff was still completely dissolved in this alkaline, salt-containing padding liquor even after one hour; no precipitations took place. It was possible to use the padding liquor to produce deep and level dyeings by application and fixing methods which are industrially customary for fiber-reactive dyestuffs, such as, in particular, by the specific pad processes mentioned in the descriptive part.

EXAMPLE 2

60 parts of a dyestuff powder which contained about 85% of the dyestuff of the formula

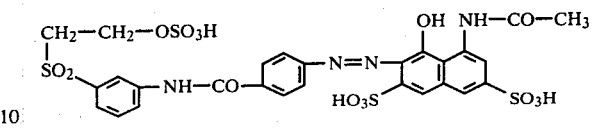

in the form of its sodium salt and about 15% of electrolyte (predominantly sodium chloride) were ground together with 10 parts of a condensation product formed from 1 mole of dimethylnaphthalenesulfonic acid and 1 mole of formaldehyde.

To prepare an alkaline salt-containing padding liquor this solid composition according to the invention was dissolved in 770 parts of water, and 22 parts by volume of a 33% strength aqueous sodium hydroxide solution and 130 parts of a 70% strength sodium silicate solution were then added to the solution. The dyestuff still remained in solution in this alkaline salt-containing padding liquor even after one hour. The padding liqour produced deep and level dyeings by means of a one-bath pad process customary in industry for fiber-reactive dyestuffs.

EXAMPLE 3

55 parts of the sodium salt of the compound of the formula

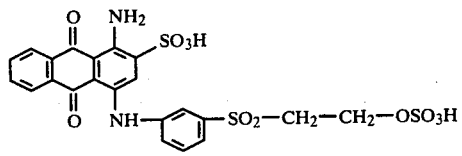

having an additional electrolyte content of about 22% were ground together with 55 parts of a condensation product formed from one mole of dimethylnaphthalenesulfonic acid and one mole of formaldehyde.

To prepare an alkaline, salt-containing padding liquor, this solid composition according to the invention was dissolved in 760 parts of water, and 15 parts of a 33% strength aqueous sodium hydroxide solution and 115 parts of a 70% strength aqueous sodium silicate solution were then added. The dyestuff was still in a clear solution in the padding liquor thus obtained at 20°–25° C. even after one hour. As a consequence of this deep and level dyeings were obtained on cellulose fiber materials by means of this padding liquor using a one-bath pad process customary in industry.

EXAMPLE 4

55 parts of the anthraquinone dyestuff used in Example 3 having an additional electrolyte content of about 22% were ground together with 50 parts of a product formed from condensing 0.8 mole of dibutylnaphthalenesulfonic acid and 1.0 mole of dimethylnaphthalenesulfonic acid with 3.6 moles of formaldehyde.

Water, an aqueous sodium hydroxide solution and an aqueous sodium silicate solution were added to this solid composition according to the invention in accordance with Example 3. The aqueous padding liquor thus prepared was still a clear solution even after 90 minutes at room temperature; a dyestuff precipitation did not occur. Deep and level dyeings were obtained on cellulose fiber materials on applying this padding liquor by a one-bath pad process.

EXAMPLE 5

60 parts of a dyestuff powder having a content of about 78% of the dyestuff of the formula

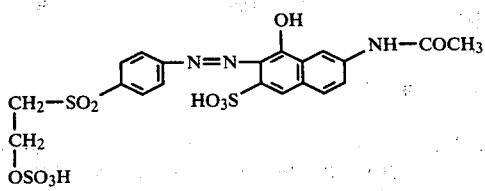

in the form of its sodium salt and a content of about 22% of electrolyte (sodium chloride) were ground together with 10 parts of a product formed from condensing 0.8 mole of dibutylnaphthalenesulfonic acid, 1.0 mole of dimethylnaphthalenesulfonic acid and 3.6 moles of formaldehyde.

This solid composition according to the invention was dissolved in about 900 parts of water and 16.5 parts of a 33% strength aqueous sodium hydroxide solution. This alkaline, salt-containing padding liquor had a high stability; the dyestuff was still completely in solution even after 3 hours. Deep and level dyeings on cellulose fiber materials were therefore obtained on applying this padding liquor by means of one-bath pad processes customary in industry for fiber-reactive dyestuffs.

COMPARATIVE EXAMPLE 1

The procedure of Example 1 above was followed, but the condensation product of Example 1 was replaced by 10 parts of a condensation product formed from 1.0 mole of monobutylnaphthalenesulfonic acid and 2.0 moles of formaldehyde. Water, an aqueous sodium hydroxide solution and an aqueous sodium silicate solution were added to this solid mixture in accordance with the instructions of Example 1. Precipitation of the dyestuff occurred after only 15 minutes; the padding liquor thus produced, after 15 minutes and by means of a one-bath pad process customary in industry for fiber-reactive dyestuffs, unlevel and weak dyeings.

COMPARATIVE EXAMPLE 2

40 parts of the dyestuff used in Example 2 above were ground together with 10 parts of a condensation product formed from 1.0 mole of monomethylnaphthalenesulfonic acid and 2.0 moles of formaldehyde. This solid pulverulent composition was processed according to the instructions of Example 2 to give an alkaline, salt-containing padding liquor. The dyestuff separated out as a precipitate after only one hour, so that weak and unlevel pad dyeings were obtained by means of this padding liquor on application to a cotton fabric by a method customary for fiber-reactive dyestuffs.

COMPARATIVE EXAMPLE 3

A solid, pulverulent dyestuff composition was prepared by following the instruction of Example 3 above, but the condensation product used there was replaced by 55 parts of a condensation product formed from 1.0 mole of monobutylnaphthalenesulfonic acid and 2.0 moles of formaldehyde. This composition was then processed in accordance with the instructions of Example 3, by addition of water, aqueous sodium hydroxide solution and aqueous sodium silicate solution, to give a salt-containing, alkaline padding liquor during the preparation of which the dyestuff immediately precipitated, partly in the form of crystals, on addition of the alkaline agents. It was therefore impossible to obtain commercially acceptable dyeings by means of this padding liquor.

COMPARATIVE EXAMPLE 4

A solid, pulverulent composition was prepared in accordance with the instructions of the above Example 3 according to the invention, but instead of the condensation product indicated there, 30 parts of a condensation product formed from 1.0 mole of monomethylnaphthalenesulfonic acid and 2.0 moles of formaldehyde were used. Water, aqueous sodium hydroxide solution and aqueous sodium silicate solution were added to this composition in accordance with the intructions of Example 3. Already, on addition of the alkaline agents in the preparation of this aqueous padding liquor, the dyestuff precipitated, partly in the form of crystals and in a manner analogous to that of Comparative Example 3. It was therefore impossible to prepare commercially acceptable dyeings by means of this padding liquor.

COMPARATIVE EXAMPLE 5

A solid composition was prepared in accordance with the instructions of Example 3 according to the invention, but the condensation product used there was replaced by 60 parts of a condensation product formed from 1.0 mole of monomethylnaphthalenesulfonic acid and 2.0 moles of formaldehyde. This pulverulent composition was converted in accordance with the instructions of Example 3 into a salt-containing alkaline aqueous padding liquor; some of the dyestuff in this padding liquor began to precipitate after only 10 minutes. Likewise, only weak and unlevel dyeings, for example on cellulose fibers, were thus obtained by means of this padding liquor.

COMPARATIVE EXAMPLE 6

A solid pulverulent composition was prepared in accordance with the above Example 3 according to the invention, but the condensation product used there was replaced by 10 parts of a condensation product formed from 1.0 mole of monomethylnaphthalenesulfonic acid and 2.0 moles of formaldehyde. The dyestuff precipitated after only 10 minutes also from an alkaline salt-containing aqueous padding liquor prepared in accordance with this Example 3 from this formulation. It was therefore impossible to obtain commercially acceptable dyeings by means of this padding liquor.

We claim:

1. A solid composition of fiber-reactive dyestuffs, which contains a condensation product formed from a dialkylnaphthalenesulfonic acid, or a mixture thereof, and formaldehyde.

2. A composition as claimed in claim 1, which contains 50 to 85% by weight of one or more fiber-reactive dyestuffs.

3. A composition as claimed in claim 1 or 2, which contains 10 to 50% by weight of a condensation product formed from a dialkylnaphthalenesulfonic acid, or a mixture thereof, and formaldehyde.

4. A composition as claimed in claim 1 wherein the condensation product is formed from dialkylnaphthalenesulfonic acids containing, on average, 1 to 1.5 sulfonic acid groups, and a 1- to 3.6-fold molar quantity of formaldehyde.

5. A composition as claimed in claim 3 or 4, wherein the fiber-reactive dyestuff is the alkali metal salt of the compound of the formula

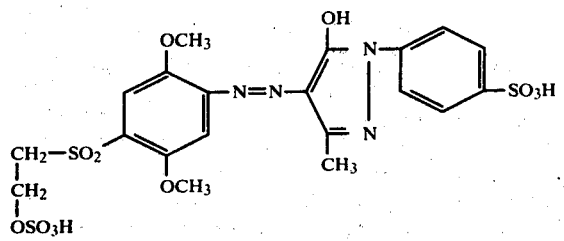

6. A composition as claimed in claim 3 or 4, wherein the fiber-reactive dyestuff is the alkali metal salt of the compound of the formula

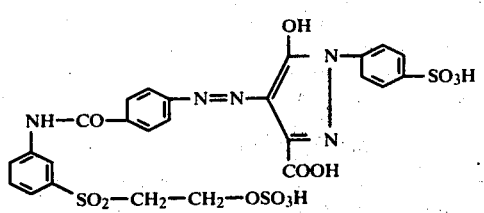

7. A composition as claimed in claim 3 or 4, wherein the fiber-reactive dyestuff is the alkali metal salt of the compound of the formula

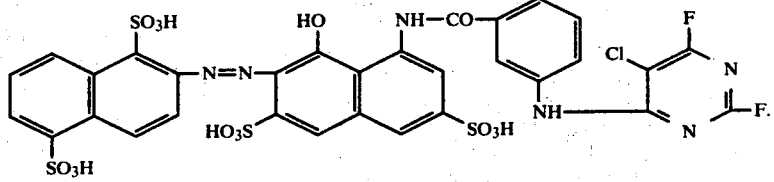

8. A composition as claimed in claim 3 or 4, wherein the fiber-reactive dyestuff is the alkali metal salt of the compound of the formula

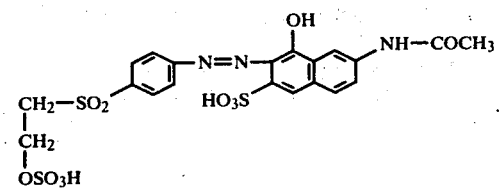

9. A composition as claimed in claim 3 or 4, wherein the fiber-reactive dyestuff is the alkali metal salt of the compound of the formula

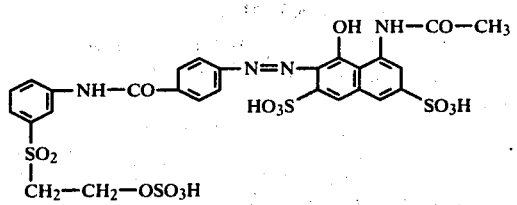

10. A composition as claimed in claim 3 or 4, wherein the fiber-reactive dyestuff is the alkali metal salt of the compound of the formula

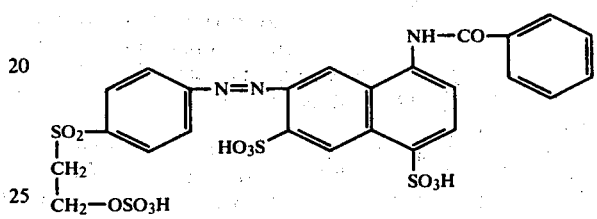

11. A composition as claimed in claim 3 or 4, wherein the fiber-reactive dyestuff is the alkali metal salt of the compound of the formula

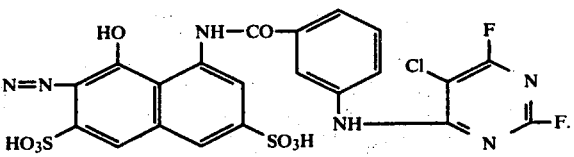

12. A composition as claimed in claim 3 or 4, wherein the fiber-reactive dyestuff is the alkali metal salt of the compound of the formula

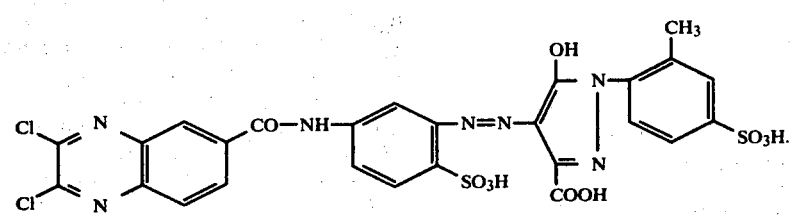

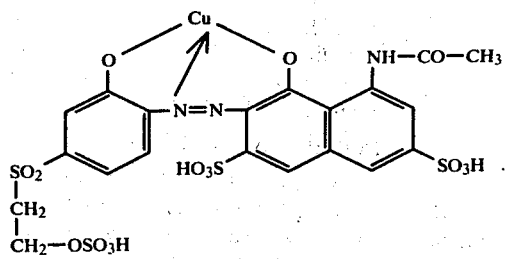

13. A composition as claimed in claim 3 or 4, wherein the fiber-reactive dyestuff is the alkali metal salt of the compound of the formula 14. A composition as claimed in claim 3 or 4, wherein the fiber-reactive dyestuff is the alkali metal salt of the compound of the formula

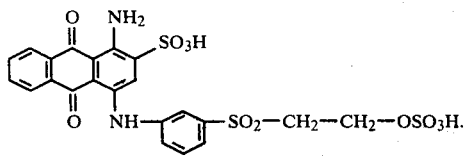

16. A composition as claimed in claim 3 or 4, wherein the fiber-reactive dyestuff is the alkali metal salt of the compound of the formula

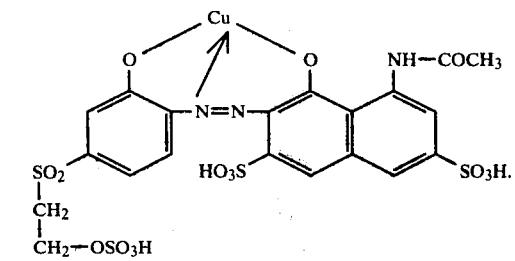

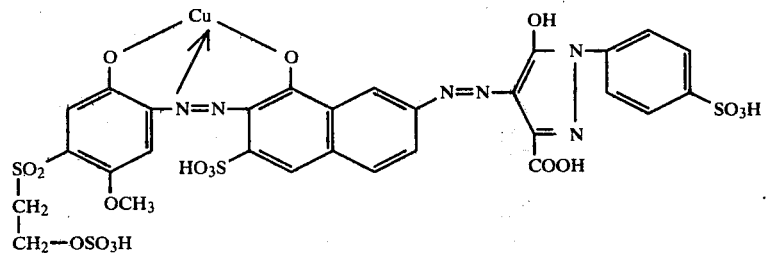

15. A composition as claimed in claim 3 or 4, wherein the fiber-reactive dyestuff is the alkali metal salt of the compound of the formula

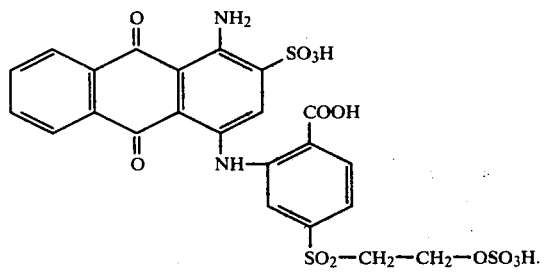

17. A method for the preparation of an alkaline aqueous dyeing liquor, having a good storage stability, which comprises dissolving in water a composition as defined in claim 1, and an alkaline agent, optionally together with an additive for preparation of salt-containing and alkaline aqueous dyeing liquors.

18. A method for the stable storage of a fiber-reactive dyestuff in an alkaline aqueous dyeing liquor, which comprises dissolving in water the solid composition as defined in claim 1, or dissolving a fiber-reactive dyestuff and a condensation product prepared from a dialkyl naphthalene sulfonic acid or mixture thereof, and formaldehyde, and an alkaline agent, optionally together with an additive for the preparation of salt-containing and alkaline aqueous dyeing liquors.

* * * * *